United States Patent [19]

Simpson

[11] 4,267,434
[45] May 12, 1981

[54] METHOD OF AND APPARATUS FOR HEAT PROCESSING PHOTOSENSITIVE MATERIAL

[75] Inventor: Gary R. Simpson, Littleton, Colo.

[73] Assignee: Honeywell Inc., Minneapolis, Minn.

[21] Appl. No.: 48,483

[22] Filed: Jun. 14, 1979

[51] Int. Cl.³ .................... H05B 1/02; G01D 15/10
[52] U.S. Cl. .................... 219/499; 219/216; 219/494; 219/497; 346/136
[58] Field of Search ............ 346/151, 136; 219/499, 219/497, 501, 507, 216, 494; 307/117

[56] References Cited

U.S. PATENT DOCUMENTS

| | | | |
|---|---|---|---|
| 3,603,768 | 9/1971 | Ireland | 219/499 |
| 4,083,054 | 4/1978 | Moraw et al. | 219/497 |
| 4,102,298 | 7/1978 | Dietze et al. | 219/499 |
| 4,104,692 | 8/1978 | Sudo et al. | 219/216 |

Primary Examiner—Arthur T. Grimley
Assistant Examiner—M. Paschall
Attorney, Agent, or Firm—Laurence J. Marhoefer; Lockwood D. Burton; Mitchell J. Halista

[57] ABSTRACT

In the method and apparatus disclosed herein, heat processing pulsing current is passed, on command, through the conductive backing of an exposed record sheet of heat-processable photosensitive material. The sheet resistance is included as one arm of a bridge which contains a settable comparison resistance in another arm. The cold sheet resistance is sensed and is used by a sample and hold arrangement to set the comparison resistance to a corresponding comparison value which represents the cold sheet resistance multiplied by a preselected percentage. That percentage is one which is known to correspond to the desired processing temperature to which the sheet temperature is to be raised in order to effect the processing of the sheet. The passage of the heat processing current is terminated when equality is detected between two signals which represent, respectively, the prevailing sheet and comparison resistances, that equality indicating that the prevailing sheet resistance has arrived at a final resistance which equals the cold sheet resistance times the preselected percentage, and which therefore corresponds to the desired processing temperature.

15 Claims, 5 Drawing Figures

METHOD OF AND APPARATUS FOR HEAT PROCESSING PHOTOSENSITIVE MATERIAL

BACKGROUND OF THE INVENTION

1. Field of the Invention

The present invention relates generally to the controlled heating of exposed heat-processable photosensitive media or material, such as so-called dry process or dry silver photosensitive or photographic material, for the purpose of heat processing the material. Such heat processing is done to develop the images which have been recorded on the material during its exposure. More specifically, the invention relates to that form of such heat processing wherein the material includes an electrically conductive backing, and wherein the heating of that material, which will be referred to hereinafter simply as material, is effected by passing an electric current through said backing.

2. Description Of The Prior Art

In carrying out the heat processing of material, as defined above, the heating current is passed through the backing of the material in such a manner that the material is heated to a so-called processing temperature for a certain period of time. That temperature and time are ones which have been found to give the desired degree of image development for the particular situation, and are usually based on time-temperature data furnished by the manufacturer of the material.

In one form of the known arrangements which provide such heat processing, the above-noted heating of the material to the desired temperature is achieved by applying the heating current to the material at a preselected value for a preselected period of time. This "programmed" method of heat processing has the disadvantage of requiring continuous adjustment to compensate for changes in certain factors. Those factors are the ones which determine how much heat must be generated in the material in a given situation in order that the correct processing temperature will be reached and maintained for the required time. A typical example of apparatus which effects the heat processing of moving material by this programmed method is the apparatus which is shown in the upper portion of FIG. 1 of the Gregg U.S. Pat. No. 3,887,787. A typical example of apparatus which effects the heat processing of individual pieces of material by a programmed method is the apparatus which is shown in the copending U.S. patent application of Dean M. Peterson, Ser. No. 891,077.

In another form of the known arrangements which provide heat processing, the heating current is passed through the backing of the material under the control of means which sense the degree of development of a test image which has been recorded on the material. An example of apparatus which operates in this manner is that which is shown in the lower portion of FIG. 1 of the above-noted Gregg patent. Such apparatus has the disadvantage of being relatively complex, due to the need for the means which produce and sense the test image. Such apparatus has the further disadvantage of producing improperly developed primary images until changes in the heating procedure are made by the apparatus following the detection of an imperfectly developed test image.

The foregoing description makes it clear that there has been a need for an improved heat processing method, and for improved apparatus which utilizes said method, which do not possess the above-noted shortcomings of the known heat processing methods and apparatus.

SUMMARY OF THE INVENTION

Accordingly, it is an object of the present invention to provide an improved method of heat processing material which repeatedly and consistently effects the desired degree of image development notwithstanding changes in the electrical characteristics of the material and other factors which influence such development. it is a further object of the invention to provide improved heat processing apparatus which operates according to said improved method, and which is of relatively simple construction with respect to the known arrangements.

The improved method according to the present invention fulfills the above-noted and other desirable objects. In so doing, that method makes use of a relationship which I have discovered between the temperature of the material being processed and the electrical resistance per square of its backing (hereinafter referred to simply as the resistance of the material). Specifically, I have discovered that, although the initial or cold resistance of the material at ambient temperature is prone to vary from piece to piece of the material, the ratio of the resistance of each such piece at a given temperature, such as the prescribed processing temperature, to its initial resistance at ambient temperature is substantially the same from piece to piece.

The significance of the relationship just described is that a change in the resistance of the material to a preselected percentage of the initial resistance consistently represents a change in the material temperature from ambient temperature to a temperature which corresponds to said percentage. Thus, by heating the material until its prevailing resistance changes to a value which is a certain percentage of its initial resistance, which percentage corresponds to the desired processing temperature, the material temperature is caused to increase to that processing temperature, and the proper processing of the material is obtained.

Consequently, the improved method of the present invention provides the desired processing and image development results by including the steps of:

(a) Determining the initial resistance of the material at ambient temperature;

(b) Applying heating current to the material to raise its temperature while continuing to determine the prevailing resistance of the material; and (c) Terminating the application of heat to the material when the prevailing resistance has changed to a preselected percentage of the initial resistance, said percentage being that which corresponds to the desired processing temperature of the material.

Due to the existence of the above-described relationship between the temperature and the resistance of the material, the performance of the above-listed steps causes the material temperature to be raised to the desired processing temperature, and this causes the material to be properly heat processed. Moreover, this heat processing is effected without requiring any actual measurement of the material temperature, and notwithstanding the above-noted variable nature of the initial resistance of the material and the other factors which influence the material temperature.

To the end of carrying out the improved method which has just been described, the improved apparatus of the invention may well include a first means which is electrically connected to the material so as to provide a signal which represents the prevailing value of the resistance of the material. This signal is applied to a second means which, in turn, is connected to a heat controlling means for controlling the application of heating energy to the material. The heat controlling means may accomplish this control by controlling the application of heating current to the material by way of the above-noted electrical connection to the material.

The second means initially causes the controlling means to effect the application of heat energy to the material. When the signal applied to the second means shows that the resistance of the material has changed to a preselected percentage of the resistance which existed at the time at which the application of the heating energy was begun, the second means causes the controlling means to terminate that application. The temperature of the material will now have been raised to a value which corresponds to said percentage. By making said percentage to one which corresponds to the desired processing temperature, the material temperature resulting from the above-described heating operation will be that processing temperature, and the proper processing of the material will be effected.

BRIEF DESCRIPTION OF THE DRAWING

A better understanding of the present invention may be had from the following detailed description when read in connection with the accompanying drawing, wherein:

FIG. 3, composed of FIGS. 3A and 3B, is a schematic circuit diagram of a preferred specific form for the heat processing apparatus shown in more general form in FIG. 2.

DETAILED DESCRIPTION

Figure 1:
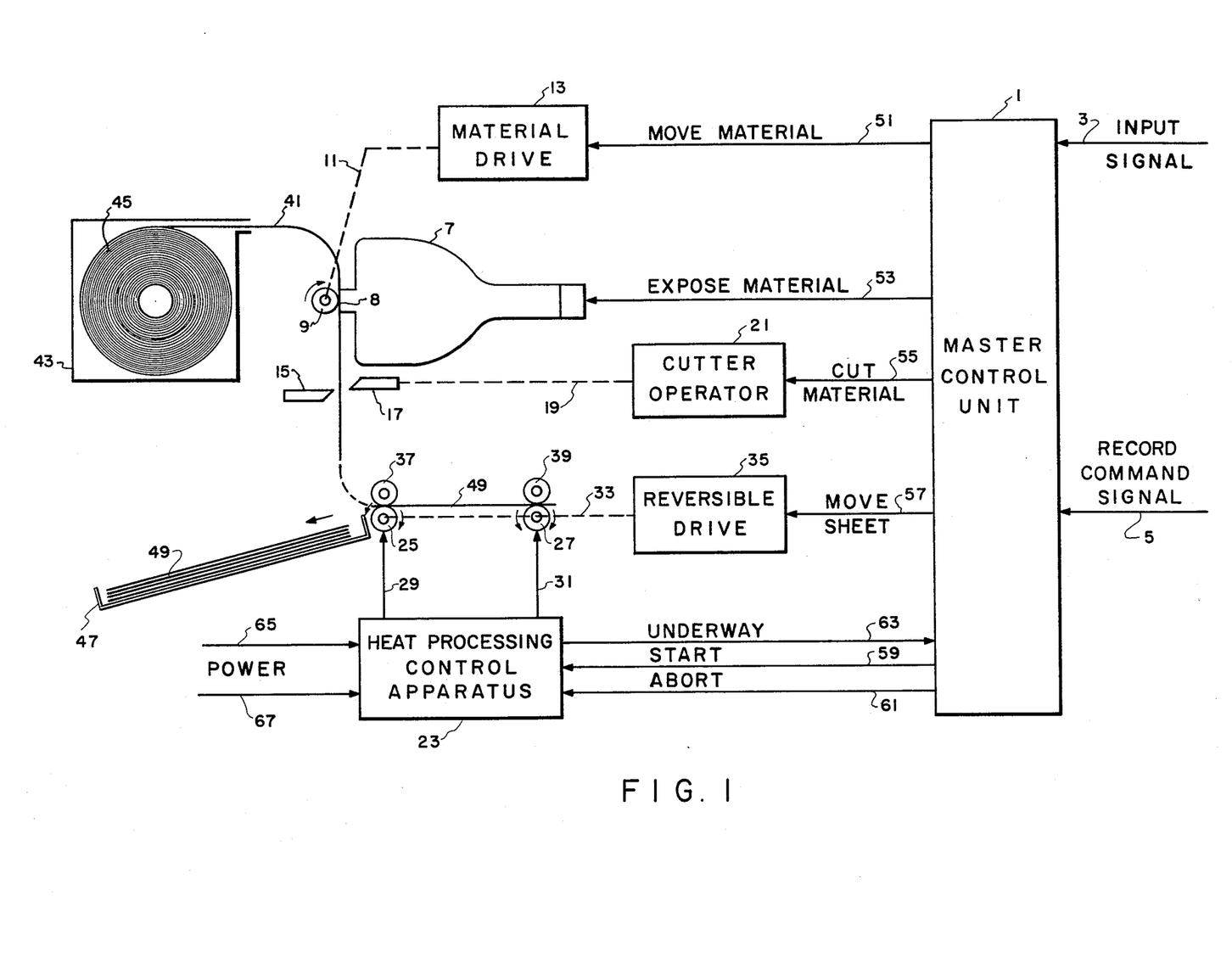
FIG. 1 is a diagrammatic showing of recording apparatus wherein the records are made on material which is heat processed by a method and apparatus according to the present invention.

THE APPARATUS OF FIG. 1

The recording apparatus which is illustrated in FIG. 1 is arranged to produce individual heat-processed recorded images or records successively on separate pieces or sheets of conductive-backed material, such as dry silver material. Each of such individual sheets of material, bearing its respective recorded image or record, will be referred to hereinafter as a record sheet or simply as a sheet. Within the apparatus, each of such record sheets is cut to a preselected fixed size from a supply roll of the material which is contained in the apparatus. The record on each record sheet represents the variation in an electrical input signal with respect to time over a time period which is commensurate with the established sheet size. Such a record sheet is produced each time that a RECORD command is given to the apparatus.

In accordance with the foregoing, the FIG. 1 apparatus includes a master control unit 1 which is arranged to receive the input signal over a connection 3. The unit 1 is also arranged to coordinate the operation of the other portions of the apparatus to produce a record sheet each time that the unit 1 receives a RECORD command signal over a connection 5.

Also included in the FIG. 1 apparatus are a recording device which is in the form of a line scan fiber optics cathode ray tube 7 having the usual fiber optics strip 8 on its face. The apparatus further includes a material driving means consisting of a material drive roller 9 which is located adjacent and parallel to the strip 8 of the tube 7 and is coupled by a linkage 11 to a material driving device 13. Also, the apparatus includes a material cutting means consisting of a cutter blade 15 and a cutter blade 17 which is coupled by a linkage 19 to a cutter operator 21. Finally, the apparatus includes a heat processing portion including control apparatus 23 and contact rollers 25 and 27. Those rollers are electrically connected to the apparatus 23 by respective connections 29 and 31, and are mechanically coupled by a linkage 33 to a reversible roller driving device 35. Upper rollers 37 and 39 cooperate with the respective contact rollers 25 and 27.

The material on which the records are made is identified in FIG. 1 by the reference numeral 41, and is shown as coming from a magazine 43 which contains a material supply roll 45 from which the individual record sheets are cut. A tray 47 is provided to receive the record sheets following the completion of their heat processing. Such a sheet is identified in FIG. 1 by the reference numeral 49.

The length of the record sheets 49 is chosen so as to make each sheet accommodate a desired amount of recorded data and hence accommodate a desired size of recorded image or record. Moreover, the spacing of the rollers 25 and 27, as well as the other dimensions and geometry of the record sheet handling portions of the apparatus, are made to be commensurate with this chosen record sheet length.

Certain of the apparatus portions as just described are so arranged within the apparatus as to establish a path of movement for the material 41 through the apparatus. This path can be traced from the supply roll 45 within the magazine 43, downward past the fiber optics strip 8, between the latter and the drive roller 9, and then downward between the cutter blades 15 and 17. From there, the path of a severed record sheet 49 of the material 41 extends downward and to the right, continuing between the rollers 25 and 37 and terminating between the rollers 27 and 39. The heat processing of the sheet 49 takes place while it is in the illustrated position between the rollers 25-37 and 27-39. After the processing of a sheet 49 is completed, the path therefor is to the left and into the tray 47.

The FIG. 1 apparatus also includes a number of signal connections between the control unit 1 and other portions of the apparatus. Those connections include a "move material" signal connection 51 to the material driving device 13, an "expose material" signal connection 53 to the tube 7, a "cut material" signal connection 55 to the cutter operator 21, a "move sheet" signal connection 57 to the reversible roller driving device 35, and a "start" signal connection 59 and an "abort" signal connection 61 to the control apparatus 23. Also, there is an "underway" signal connection 63 from the control apparatus 23 to the unit 1. The control apparatus 23 is powered by way of a pair of power supply connections 65 and 67 which would be connected to a suitable source, not shown, of a.c. power for the heat processing operation.

OPERATION OF THE FIG. 1 APPARATUS

The FIG. 1 apparatus is made to produce a record sheet by placing a RECORD command signal on the connection 5. In response to that signal, the unit 1 sends a signal over the connection 51. The latter signal causes the drive device 13 to rotate the roller 9 so as to move the material 41 from the roll 45 downward over, and in recording relationship to, the strip 8 of the tube 7. This recording movement of the material 41 takes place at a preselected uniform rate for a preselected time period which are such as to yeild the above-noted chosen length for the record sheets 49. Simultaneously, the drive device 35 is activated by a signal from the unit 1 over the connection 57 to so drive the rollers 25 and 27 that the leading end of the material 41 coming downward past the blades 15 and 17 is caught between the rollers 25 and 37 and is conveyed to the right toward the rollers 27 and 39.

As the material 41 is being moved downward over the strip 8 of the tube 7, the unit 1 sends a signal over the connection 53 to the tube 7 which causes the beam of the tube 7 to sweep repeatedly across the width of the strip 8 and the material 41, and to be modulated in accordance with the input signal present on the connection 3. As a result, a record of the input signal is recorded on the chosen length of the material 41 throughout said preselected time period.

At the end of the last-noted period, the recording operation of the tube 7 is terminated. Then, at a time which is sufficiently later to have allowed the recorded portion of the material 41 to have moved completely past the blades 15 and 17, a signal on the connection 55 is produced by the unit 1 to cause the operator 21 to actuate the blade 17 to cut the material 41 and so sever a record sheet 49 from the remainder of the material 41. The rotation of the roller 9 and the downward movement of the material 41 are then terminated. The rotation of the rollers 25, 27, 37, and 39 continues, however, for a time period which is sufficient to cause that rotation to move the leading end of the now severed record sheet 49 into place between the rollers 27 and 39. The operation of the device 35 and the rotation of the rollers 25, 27, 37, and 39 are then terminated by way of the connection 57. The record sheet 49 is then held stationary in a processing position as shown in FIG. 1, with its leading end gripped between the rollers 27 and 39, with its trailing end gripped between the rollers 25 and 37, and with the rollers 25 and 27 in electrical contact with the conductive backing of the record sheet 49.

At the time at which the unit 1 terminates the rotation of the rollers 25, 27, 37, and 39 and thus terminates the movement of the record sheet 49 to the right into its processing position, the unit 1 also sends a START signal to the control apparatus 23 over the connection 59. In response to that signal, the apparatus 23 passes heating current through the record sheet 49 over a path which can be traced from the apparatus 23 over the connection 29 and the roller 25 to the conductive backing of the record sheet 41, through that backing to the roller 27, and then over the roller 27 and the connection 31 to the apparatus 23. While this heating current is flowing through the record sheet 49, the connections 29 and 31 enable the apparatus to sense and monitor the prevailing resistance of the record sheet 49. Throughout this heating period, the apparatus 23 sends an UNDERWAY signal to the unit 1 over the connection 63.

When the apparatus 23 senses that the prevailing resistance of the record sheet 49 has changed to the preselected percentage of the initial or cold resistance of the sheet which corresponds to the desired processing temperature of the sheet, the apparatus 23 terminates the flow of the heating current over the above-described path, leaving the record sheet 49 in a fully processed condition. Simultaneously, the apparatus 23 terminates the signal on the connection 63. In response, the unit 1 sends a signal over the connection 57 which causes the driving device 35 to rotate the rollers 25 and 27 in the direction which moves the now processed record sheet 49 to the left, away from the last-noted rollers and into the tray 47. This rotation of the last-noted rollers continues for a time period which is sufficient to allow the record sheet 49 to move fully into the tray 47. Thereafter, the unit 1 terminates the operation of the driving device 35 and awaits the next RECORD command signal on the connection 5.

In the event that a situation arises that dictates that the heat processing of a record sheet 49 should be terminated before the apparatus 23 senses the completion of the processing of the record sheet, the unit 1 is caused to send an ABORT signal to the apparatus 23 over the connection 61. Upon receipt of such a signal, the apparatus 23 terminates the flow of the heating current and the production of the signal on the connection 63, causing the unit 1 to effect the early actuation of the driving device 35 and the resulting ejection of the incompletely processed record sheet from its processing position into the tray 47.

Figure 2:
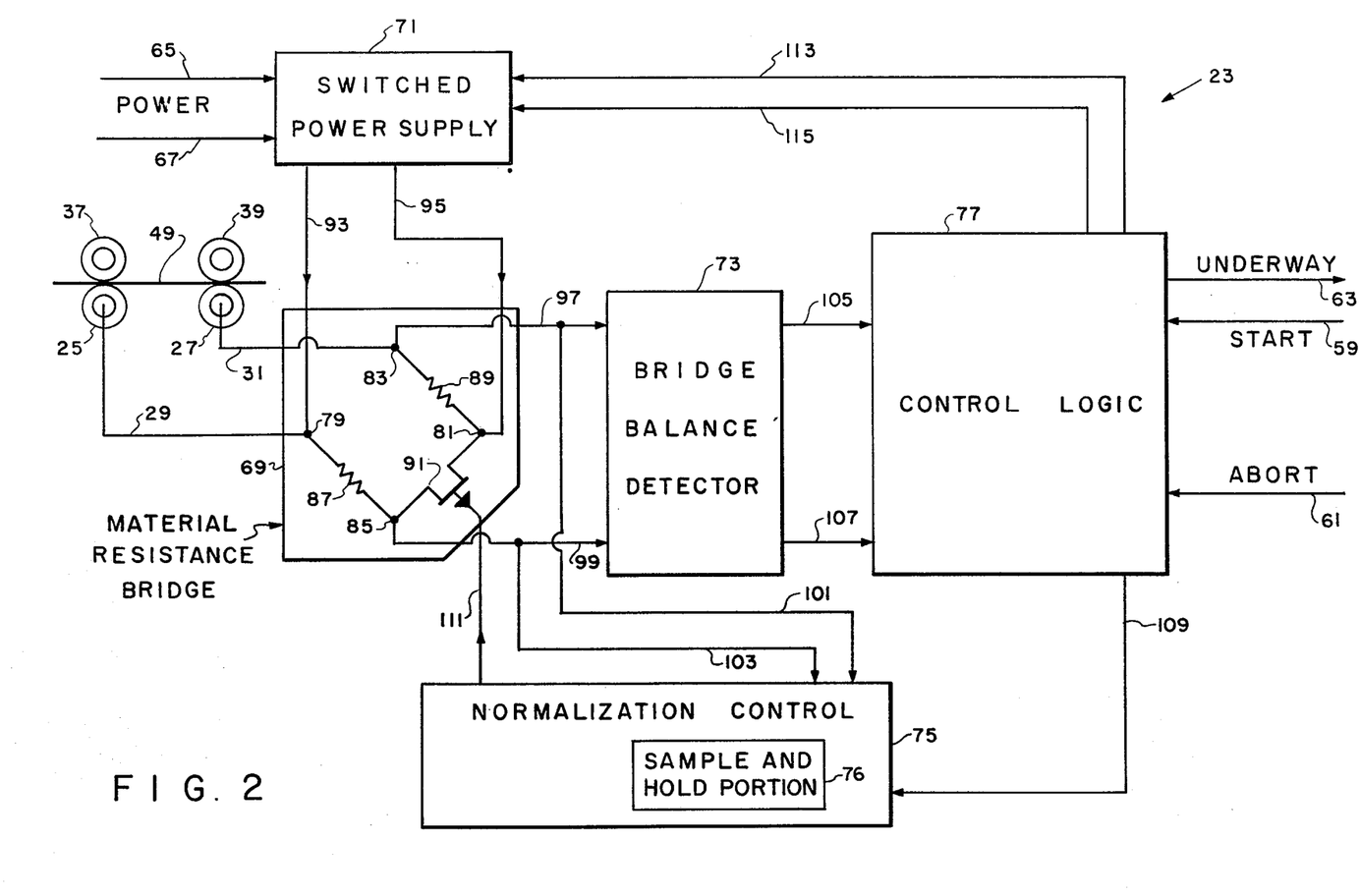
FIG. 2 is a diagrammatic showing of a preferred form of the heat processing apparatus portion of the FIG. 1 apparatus.
Figure 3A:
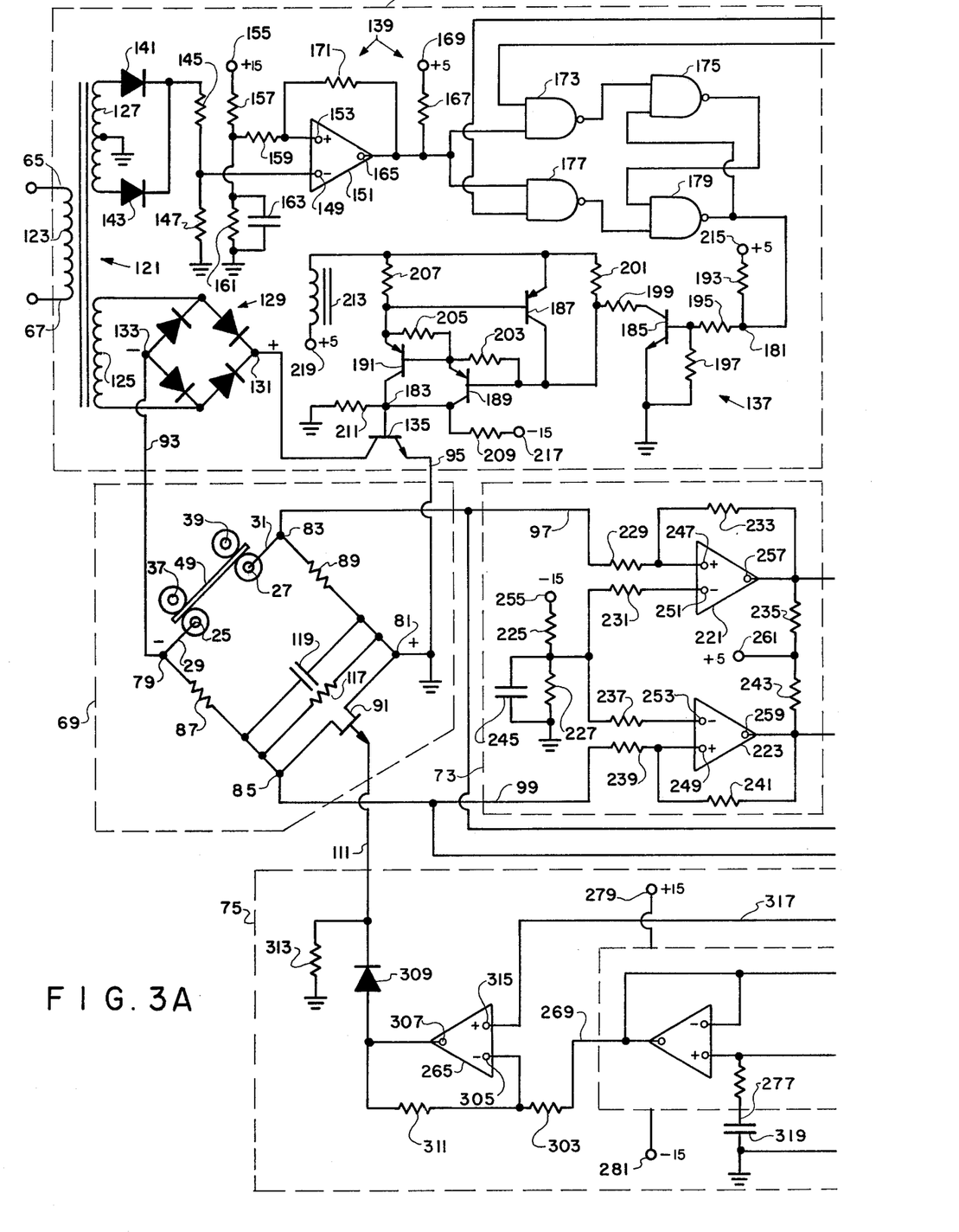
Figure 3B:
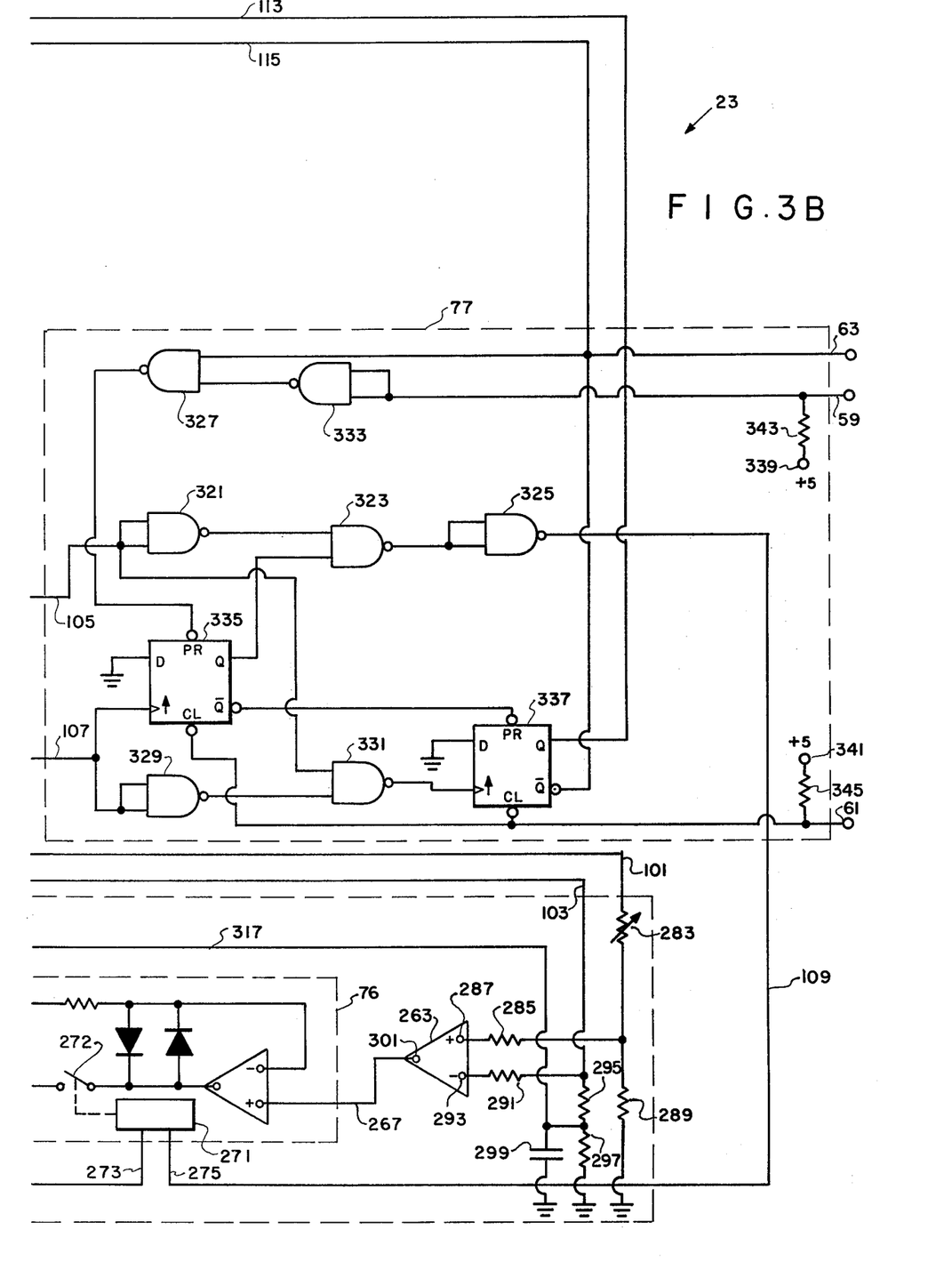

THE APPARATUS OF FIGS. 2 AND 3

A preferred form for the heat processing control apparatus 23 of the FIG. 1 recording apparatus is shown in block diagram form in FIG. 2 and in schematic circuit detail in FIG. 3. With reference first to FIG. 2, the apparatus 23 includes a material resistance bridge circuit portion or bridge 69, a controlled or switched power supply portion 71 for the bridge 69, a bridge balance detector portion 73, and a normalization control portion 75 containing a sample and hold portion 76. The apparatus 23 also includes a control logic portion 77 which coordinates the operation of the other portions of the apparatus. To this end, the signal connections 59, 61, and 63 from the control unit 1 are made to the apparatus 23 by way of the logic portion 77, all as is shown in FIG. 2.

The bridge 69 includes first and second input or energizing terminals 79 and 81, first and second output terminals 83 and 85, resistors 87 and 89, and the source-drain path of a field effect transistor (FET) 91. The resistor 87 is connected between the terminals 79 and 85 as one arm of the bridge 69, the resistor 89 is connected between the terminals 81 and 83 as the second arm of the bridge 69, and the FET 91 is connected between terminals 81 and 85 as the third arm of the bridge 69. The effective resistance of the FET 91 determines the resistance of the third bridge arm, and that resistance will be referred to hereinafter as the comparison resistance.

As was previously noted, when a record sheet 49 is in its processing position, the apparatus 23 senses and monitors the prevailing resistance of that sheet by way of the connections 29 and 31. This is implemented in the FIG. 2 form of apparatus by having the connections 29 and 31 thereof connect into the bridge 69, as the remaining arm thereof, that portion of the resistance of the record sheet 49 which lies between the contact rollers 25 and 27. Specifically, the connection 29 connects the roller 25 to the bridge terminal 79, and the connecton 31 connects the roller 27 to the bridge terminal 83.

The bridge 69 is energized or powered with bridge energizing current from the supply 71 by way of a connection 93 which connects the supply 71 to the bridge terminal 79, and by way of a connection 95 which connects the supply 71 to the bridge terminal 81. The supply 71, in turn, receives power from the previously described connections 65 and 67.

The bridge output terminals 83 and 85 are connected by respective connections 97 and 99 to the input of the bridge balance detector 73, and are connected to the input of the normalization control portion 75 by respective connections 101 and 103. The output of the detector 73 is connected by connections 105 and 107 to the control logic portion 77. A normalization control connection 109 extends from the logic portion 77 to the normalization portion 75, and a comparison resistance setting connection 111 extends from the portion 75 to the gate of the bridge FET 91. Finally, the logic portion 77 controls the supply of energizing current to the bridge 69 from the supply 71 by way of connections 113 and 115.

OPERATION OF THE FIG. 2 APPARATUS

The operation of the FIG. 2 apparatus will be described only briefly at this point, since the more detailed description to be given hereinafter in connection with the more detailed circuit disclosure of FIG. 3 pertains also to the FIG. 2 disclosure. It is sufficient to note at this time that the appearance of a START signal on the connection 59 causes the supply 71 to supply energizing voltage and current to the bridge 69 at a starting time. As a result, material heating current flows through the connections 29 and 31 and through the record sheet 49.

The bridge construction described above can, for convenience, be thought of as consisting of two resistive branches connected in parallel between the energizing terminals 79 and 81. One of those branches consists of the record sheet resistance and the resistor 89 connected in series between the terminals 79 and 81 and producing at the output terminal 83 a first voltage, hereinafter referred to as the sheet resistance voltage or sheet signal, which represents the prevailing resistance of the record sheet 49. The other of those branches consists of the resistor 87 and the FET 91 connected in series between the terminals 79 and 81 and producing at the output terminal 85 a second voltage, hereinafter referred to as the FET or comparison resistance voltage or comparison signal, which represents the above-noted comparison resistance or effective resistance of the third bridge arm.

As the bridge energizing and material heating current begins to flow through the bridge 69, the sheet signal, representing the prevailing resistance of the record sheet 49, appears on the bridge output connections 97 and 101. Also, the comparison signal, representing the existing comparison resistance, appears on the bridge output connections 99 and 103. The prevailing resistance at this time is the cold resistance of the record sheet 49, and the corresponding sheet signal is a cold sheet signal.

Before the heating current can appreciably change the cold record sheet temperature and resistance, the portion 75 utilizes the cold sheet signal on the bridge output terminal 83 and on the connection 101, and the comparison signal on the bridge output terminal 85 and on the connection 103, to normalize the bridge 69. This means that the portion 75 uses the last-noted two signals to develop, store, and place on the connection 111 a signal which makes the resistance of the FET 91, and hence the comparison resistance, have a value which represents the above-noted preselected percentage, such as 150%, of the cold sheet resistance. This establishes the comparison resistance at a value which represents that value of the prevailing sheet resistance at which the flow of the bridge current is to be terminated. That value of the prevailing sheet resistance will thus be referred to hereinafter as the final sheet resistance. If it is assumed, in order to simplify the description presented herein of the apparatus operation, that the resistances of the resistors 87 and 89 are equal, it follows that the comparison resistance value which the portion 75 establishes is equal to the reciprocal of the preselected percentage of the cold sheet resistance which, in turn, is always equal to the final sheet resistance.

As the heating current heats and raises the temperature of the record sheet 49, the prevailing resistance of the latter increases toward the final sheet resistance, and the corresponding sheet signal on the connection 97 decreases toward the fixed comparison signal on the connection 99 which represents the fixed comparison resistance. Stated differently, the bridge output signal between the connections 97 and 99 decreases as the record sheet temperature increases. When that temperature has risen to the preselected processing temperature, the prevailing resistance becomes the final sheet resistance, and hence becomes equal to the reciprocal of the comparison resistance. At that time, the signal difference between the connections 97 and 99 drops to zero. The detector portion 73 senses this condition and correspondingly signals the logic portion 77 over the connections 105 and 107. The portion 77 then signals the supply 71 over the connections 113 and 115 to terminate the flow of energizing current to the bridge 69 and hence to terminate the flow of heating current to the record sheet 49. Thereafter, the heat processed record sheet 49 is discharged to the left as explained above in connection with the FIG. 1 apparatus.

THE DETAILS OF FIG. 3

THE BRIDGE 69

In the specific form of the FIG. 2 apparatus which is shown in FIG. 3, the bridge 69 includes, in addition to the elements shown in FIG. 2, a resistor 117 and a capacitor 119. Those elements are connected in parallel to the FET 91. Also, the bridge terminal 81 is shown as being connected to ground or apparatus common.

THE POWER SUPPLY 71

In FIG. 3, the bridge power supply portion 71 includes a power transformer 121 having a primary winding 123 which is connected across the power connections 65 and 67, and having respective secondary windings 125 and 127. The winding 125 is connected to a full wave bridge rectifier 129 having a positive output terminal 131 and a negative output terminal 133. The terminal 131 is connected through the collector-emitter path of an NPN switching transistor 135 to the bridge supply connection 95. The terminal 133 is connected to the bridge supply connection 93. Accordingly, the aforementioned bridge energizing current in the connections 93 and 95 is supplied from the rectifier 129 by way of the transistor 135, and is in the form of pulsing direct current. As a result, the sheet signal and the comparison signal, which constitute the output of the bridge 69, are pulsing signals whose difference at any given time during a bridge energizing current pulse represents the difference between the prevailing sheet and comparison resistances.

The supply 71 of FIG. 3 also includes a transistor amplifier 137 for turning the transistor 135, and hence the bridge energizing current, on and off as dictated by the apparatus logic portion 77 by way of the connections 113 and 115. Also, the supply 71 includes a zero-crossing detector circuit 139 which assures that the turning on and off of the transistor 135 by the amplifier 137 occurs only when the bridge energizing voltage between the terminals 131 and 133 is at a minimum value.

In the detector circuit 139 just referred to above, the transformer winding 127 cooperates with diode rectifiers 141 and 143 and resistors 145 and 147 to supply a full-wave rectified or pulsing d.c. reference signal to the inverting input terminal 149 of a comparator 151. Said reference signal varies or pulses in phase with the pulsing bridge energizing voltage of the rectifier terminals 131 and 133. The non-inverting input terminal 153 of the comparator 151 is supplied with a steady d.c. reference signal from a positive d.c. supply terminal 155 by way of resistors 157, 159, and 161 and a capacitor 163. The output terminal 165 of the comparator 151 is connected through a resistor 167 to a positive d.c. supply terminal 169, and is connected to the comparator input terminal 153 through a deadband-establishing feedback resistor 171. This construction is such that a logic signal is produced on the output terminal 165 which is positive or high only for the repeated short periods in which the pulsing bridge energizing voltage between the terminals 131 and 133 is below a small value, such as fifty millivolts.

The detector circuit 139 of the supply 71 also includes a logic portion containing four NAND gates 173, 175, 177, and 179. One input of each of the gates 173 and 177 is connected to the comparator output terminal 165, and the other input of each of the gates 173 and 177 is connected to a respective one of the logic signal connections 115 and 113 from the apparatus logic portion 77.

The outputs and the remaining inputs of the gates 173, 175, 177, and 179 are interconnected as shown in FIG. 3 to the end that those gates provide a toggle action on the output of the gate 179, which is the output of the detector 139. That action is jointly controlled by the logic portion 77 and by the logic signal on the comparator output terminal 165.

Specifically, the appearance of a high on the connection 113 and a low on the connection 115, as occurs when the portion 77 dictates that the bridge energizing current is to flow, toggles the output of the gate 179 to a high state upon the next appearance of a high on the terminal 165 indicative of a minimum in the bridge energizing voltage. Conversely, the appearance of a low on the connection 113 and a high on the connection 115, as occurs when the portion 77 dictates that the bridge energizing current flow should be terminated, toggles the output of the gate 179 to a low state upon the next appearance of a high on the terminal 165.

The above-noted amplifier portion 137 of the supply 71 has an input junction 181 which is connected to the above-noted output of the gate 179. Also, the amplifier 137 has an output junction 183 which is connected to the base of the switching transistor 135. Between the junctions 181 and 183, the amplifier 137 includes transistors 185, 187, 189, and 191, resistors 193, 195, 197, 199, 201, 203, 205, 207, 209, and 211, and an inductor 213. The resistors 193 and 209, and the inductor 213, are connected to respective d.c. supply terminals 215, 217, and 219 as shown. The noted elements of the amplifier 137 are interconnected as shown in FIG. 3 to the end that a high on the input junction 181, dictating that the bridge energizing current should flow, causes the transistor 135 to be on, while a low on the input junction 181 causes the transistor 135 to be off.

In summary, the appearance of a high on the connection 113 and a low on the connection 115 turns on the transistor 135 and starts the flow of bridge energizing current when the bridge energizing voltage is or next becomes suitably low. Conversely, the appearance of a high on the connection 115 and a low on the connection 113 turns off the transistor 135 and terminates the flow of bridge energizing current when the bridge energizing voltage is or next becomes suitably low. This concludes the description of the supply 71 with its zero-crossing detector 139 and other portions.

THE BRIDGE BALANCE DETECTOR 73

In FIG. 3, the detector 73 includes comparators 221 and 223, resistors 225, 227, 229, 231, 233, 235, 237, 239, 241, and 243, and a capacitor 245. The bridge output connection 97 from the bridge output terminal 83 is connected through the resistor 229 to the non-inverting input terminal 247 of the comparator 221. Similarly, the bridge output connection 99 from the bridge output terminal 85 is connected through the resistor 239 to the non-inverting input terminal 249 of the comparator 223.

The remaining, inverting input terminals 251 and 253 of the respective comparators 221 and 223 are connected to a source of a fixed d.c. bias signal. Specifically, the resistors 225 and 227 are connected in series between a negative d.c. supply terminal 255 and ground, and the junction between those resistors is connected through the resistor 231 to the terminal 251, and through the resistor 237 to the terminal 253. The capacitor 245 is connected across the resistor 227.

The output terminal 257 of the comparator 221 is connected to the detector output connection 105 which goes out to the logic portion 77. Similarly, the output terminal 259 of the comparator 223 is connected to the detector output connection 107 which also goes out to the portion 77. The terminals 257 and 259 are also connected to a positive d.c. supply terminal 261 by the respective resistors 235 and 243, and are connected to the respective input terminals 247 and 249 by the respective feedback resistors 233 and 241. This completes the description of the detector 73.

THE NORMALIZATION CONTROL PORTION 75

The portion 75 of FIG. 3 includes operational amplifiers 263 and 265 and several other components, to be described below, in addition to the above-mentioned sample and hold portion 76. The latter, which is of conventional construction, has an input connection 267, an output connection 269, a switch driver 271 which operates a switch 272 and which has connections 273 and 275, a timing connection 277, and respective positive and negative supply connections which are connected to respective d.c. supply terminals 279 and 281.

Within the portion 75, the bridge output connection 101 from the bridge output terminal 83 is connected through an adjustable resistor 283 and a resistor 285 to the non-inverting input terminal 287 of the amplifier 263. The junction between the resistors 283 and 285 is connected through a resistor 289 to ground. Further, the bridge output connection 103 from the bridge output terminal 85 is connected through a resistor 291 to the inverting input terminal 293 of the amplifier 263, and is also connected to ground through series connected resistors 295 and 297. A capacitor 299 is connected across the resistor 297.

The output terminal 301 of the amplifier 263 is connected to the input connection 267 of the sample and hold portion 76. The output connection 269 of the latter is connected through a resistor 303 to the inverting input terminal 305 of the amplifier 265. The output terminal 307 of the amplifier 265 is connected through a diode 309 to the aforementioned comparison resistance setting connection 111 which, in turn, is connected to the gate of the bridge FET 91.

A resistor 311 is connected between the terminals 305 and 307 of the amplfier 265, and a resistor 313 is connected between the connection 111 and ground. The non-inverting input terminal 315 of the amplifier 265 is connected by a connection 317 to the junction between the resistors 295 and 297, and hence receives a portion of the signal which is on the inverting input terminal of the amplifier 293.

The switch driver connection 275 of the sample and hold portion 76 is connected to the previously-noted normalization control connection 109 from the logic portion 77. The remaining switch driver connection 273 is connected to ground. The connection 277 from the portion 76 is connected to ground through a capacitor 319.

As a result of the construction and connections of the portion 75 which have been described above, the amplifier input terminal 293 receives a first signal which is a fixed fraction of the comparison signal on the connection 103, and which therefore represents the existing comparison signal and comparison resistance. Also, at the start of each heat processing operation, the amplifier input terminal 287 receives a second signal which is an adjustable fraction of the cold sheet signal on the connection 101, the value of that fraction corresponding to the adjusted value of the resistor 283. In response to those first and second signals, the amplifier 263 acts through the portion 76 and the amplifier 265 to cause such a signal to be produced on the connection 111 and on the gate of the FET 91 that the comparison signal on the terminal 293 is made equal to the adjusted cold sheet signal on the terminal 287. By setting the resistor 283 to make the last-noted fraction equal to the reciprocal of the above-defined preselected percentage expressed as a fraction, the resulting value of comparison resistance which is established and held by the portion 75 is that which equals the reciprocal of cold sheet resistance multiplied by said preselected percentage. This operation of the portion 75 thus normalizes the bridge 69.

THE CONTROL LOGIC PORTION 77

The portion 77 of FIG. 3 includes NAND gates 321, 323, 325, 327, 329, 331, and 333 and D flops 335 and 337. The detector output connection 105 is connected through the gate 321, which is connected to operate as an inverter, to one of the inputs of the gate 323. The output of the latter is connected through the gate 325, which is connected as an inverter, to the sample and hold control connection 109.

The remaining input of the gate 323 is connected to the Q output of the D flop 335. The other portions of the latter are connected as follows: the D input is connected to ground, the CLOCK input is connected to the detector output connection 107, the CLEAR input is connected to the ABORT signal connection 61, the PRESET input is connected to the output of the gate 327, and the $\bar{Q}$ output is connected to the PRESET input of the D flop 337.

The detector output connection 107 is also connected through the gate 329, which is connected as an inverter, to one of the inputs of the gate 331. The other input of the latter is connected to the detector output connection 105. The output of the gate 331 is connected to the CLOCK input of the D flop 337. The remaining portions of the latter are connected as follows: The D input is connected to ground, the CLEAR input is connected to the ABORT signal connection 61, the Q output is connected to the output connection 113, and the $\bar{Q}$ output is connected to the output connection 115. The latter is also connected the the UNDERWAY signal connection 63.

The START signal connection 59 is connected through the gate 333, which is connected as an inverter, to one of the inputs of the gate 327. The other input of the latter is connected to the output connection 115. Finally, the connections 59 and 61 are connected to respective positive d.c. supply terminals 339 and 341 through respective resistors 343 and 345. This completes the description of the portion 77 as well as the description of the entire FIG. 3 apparatus.

OVERALL OPERATION OF THE APPARATUS OF FIGS. 2 AND 3

Prior to the appearance of a START signal on the connection 59, the latter is high. Also, the D flop 337 is reset, causing the connection 113 to be low and the connections 115 and 63 to be high. For this condition, the transistor 135 in the supply 71 is off, and the bridge 69 is not energized, as explained hereinbefore. As a result, the sheet signal comparator output connection 105 and the comparison signal comparator output connection 107 are high. Also at this time, the D flop 335 is reset, whereby its $\bar{Q}$ output is high and its Q output is low. This causes the normalization control connection 109 to be low, with the result that the sample and hold switch 272 is open.

When, at a time T0, the FIG. 1 control unit 1 initiates a heat processing operation, it momentarily pulls the START connection 59 low. This results in the gate 327 receiving two highs, whereby the output of the latter goes low and sets the D flop 335. The $\bar{Q}$ output of the latter then goes low, and this sets the D flop 337. The latter now reverses the condition of the connections 113 and 115, making the first one high and the other one low. This readies the power supply 71 to turn on the transistor 135, and also places a low on the UNDERWAY signal connection 63.

On the next drop in the pulsing bridge energizing voltage, the power supply gate 179 turns on the transistor 135. Consequently, at a following time T1, the first pulse of bridge energizing current starts to flow in what will be referred to as the first energizing period. As a result, the sheet and comparison signals start to rise in their first pulses on the inputs of the comparators 221 and 223.

At a subsequent time T2 in the first energizing period, one of the sheet and comparison signals reaches a value which causes the corresponding one of the connections 105 and 107 to go low. The lower the cold sheet resistance is, the earlier in the energizing period the connection 105 goes low. Conversely, the higher the initial comparison resistance is, the earlier in the energizing period the connection 107 goes low. The net result of this is that the higher the sheet or comparison signals are going to be when the bridge energizing voltage is at its maximum, the earlier in the energizing period the corresponding connection 105 or 107 goes low.

Let it be assumed that the initial comparison resistance is sufficiently high that it is the connection 107 which goes low at the time T2. Then, at a later time T3, the connection 105 goes low. The gate 323 now receives two highs. This makes the output of the latter low, which, in turn, puts a high on the normalization control connection 109. This, in turn, causes the switch driver 271 to maintain the sample and hold switch 272 in the closed condition. The portion 76 is now operating in the SAMPLE mode to normalize the bridge 69.

The portion 75 proceeds to establish the required value of the comparison resistance on the basis of the cold sheet resistance and the preselected percentage setting of the resistor 283. This normalization is accomplished as the amplifier 263 compares its two input signals and adjusts the gate signal and resistance of the FET 91 so as to reduce the difference between the amplifier input signals to zero. During this operation, the amplifier 265 serves to linearize the relationship between the effective resistance and the gate signal of the FET 91.

The described normalization procedure continues until the time T4 in the first energizing period at which the changing value of the comparison signal causes the connection 107 to go high. By this time, the comparison resistance has been set to the required value. When the connection 107 goes high, the D flop 335 is reset by way of its CLOCK input. This, in turn, causes the connection 109 to go low and to open the switch 272, thereby terminating the normalization procedure. The portion 75 has now been placed in the HOLD mode, which maintains the comparison resistance and comparison signal at their proper values for the ensuing sheet heating period.

Before the end of the first energizing period, the changing value of the sheet signal causes the connection 105 to go high at a time T5. This has no effect on the apparatus operation.

In the second energizing period, the connection 105 goes low at a time T6 which is dependent upon the value of the prevailing sheet resistance and the corresponding sheet signal. Later, at a time T7 which is dependent upon the value of the comparison signal, the connection 107 goes low. These actions have no effect on the apparatus operation. Since the prevailing resistance of the only partially heated record sheet 49 is always less than the comparison resistance, the connection 105 always goes low in the second energizing period before the connection 107 goes low. Similarly, the connection 107 goes high at a time T8 which is previous to a time T9 at which the connection 105 goes high. This relationship may be described by stating that, in the second energizing period, the low on the connection 105 is always longer than the low on the connection 107. This is true for all energizing periods up to the one wherein the heating of the record sheet 49 has been completed and is to be terminated.

The bridge energizing current continues to heat the record sheet 49 and to raise its temperature and resistance, and to reduce the sheet signal, until the sheet resistance arrives at, and just slightly exceeds, the reciprocal of the comparison resistance. In the energizing period in which this occurs, the connection 107 goes low at a time T10 which precedes a time T11 at which the connection 105 goes low. This occurs because the comparison signal is now slightly larger than the decreasing sheet signal.

When the connection 107 goes low as noted above, the gate 331 receives two highs and puts a low on the CLOCK input of the D flop 337. This has no effect on the latter. However, when the connection 105 then goes low at the time T11, the gate 331 receives a low and a high, and so puts a high on the CLOCK input of the D flop 337. This, in turn, causes the latter to be reset, and to toggle the connections 113 and 115 to make the former low and the latter high. At the end of this last energizing period, this condition of the connections 113 and 115 turns off the transistor 135 and so terminates the flow of bridge energizing and sheet heating current.

The switching of the connection 115 from low to high terminates the low UNDERWAY signal on the connection 63. When this occurs, the unit 1 proceeds to cause the processed record sheet 49 to be ejected from the rollers 25 and 27 as explained above in connection with FIG. 1.

If, for some reason, there is no record sheet between the rollers 25 and 27 at a time at which a START signal makes the connection 59 low, the operation described above commences, but the sheet signal comparator output connection 105 never goes low. Consequently, when the connection 107 goes high in the first or second energizing period with the connection 105 already high, the resulting high on the output of the gate 331 resets the D flop 337. This terminates the flow of bridge energizing current, and signals the unit 1 by way of the disappearance of the low on the connection 63, just as does the resetting of the D flop 337 at the end of a normal sheet processing operation.

In the event that a situation arises that dictates that the heat processing of a record sheet 49 should be terminated before the apparatus 23 senses the completion of the processing of the record sheet, the unit 1 makes the ABORT connection 61 low. Since this connection is connected to the CLEAR inputs of the D flops 335 and 337, said low resets the D flops and terminates the flow of bridge energizing current and the UNDERWAY signal, all as described above. This causes the unit 1 to effect the early actuation of the driving device 35 and the resulting ejection of the incompletely processed record sheet from its processing position into the tray 47.

As explained above, the detector 73 and the portion 77 cooperate to sense when the sheet signal has become equal to the comparison signal—that is, to sense when the bridge 69 becomes balanced. A simple analog comparison of the sheet and comparison signals cannot be used to detect such balance, since such a comparison would give a false indication of bridge balance each time that the bridge energizing current, and hence said two signals, passed through zero between energizing pulses.

Figure 4:
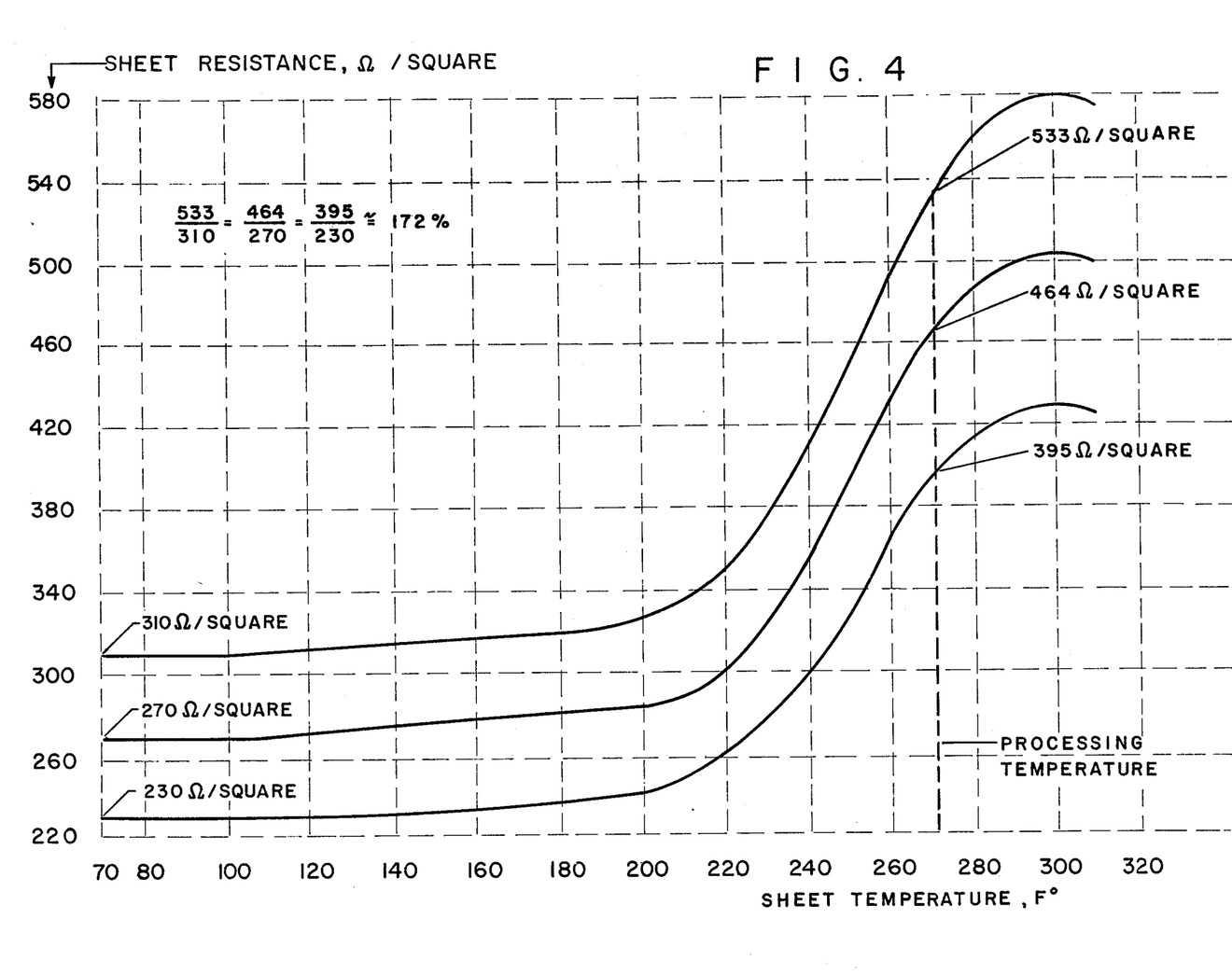
FIG. 4 is a group of curves which illustrates the relationship between the resistance and the temperature of the material which is considered to be used in the apparatus of FIGS. 1 through 3.

THE CURVES OF FIG. 4

The FIG. 4 curves show the relationship between resistance and temperature for three typical record sheets of the type considered herein. These curves illustrate the fact that, for each sheet, the desired processing temperature of 270° F. will be reached if the sheet is heated until its resistance becomes equal to 172% of its cold resistance. For such sheets, therefore, the resistor 283 of the portion 75 would be set to that value which would give a comparison resistance equal to 172% of the reciprocal of cold sheet resistance.

If, for a different type or batch of record sheet material, the common or preselected percentage were found to have a different value, such as the value of 150 referred to by way of example hereinbefore, it would be necessary to set the resistor 283 to a new value corresponding to this different common percentage. Thereafter, the apparatus would establish the proper comparison resistance for each sheet, based on this new percentage as well as on the cold resistances of the individual sheets. It has been found in practice that said percentage may vary from 140 to 200 for different batches of the material.

Summarizing the above-described operation, it is noted that, on demand, heat processing current is passed through the record sheet 49, and the cold sheet resistance is sensed. The desired final resistance of the sheet is then established by way of the comparison resistance as a preselected percentage of the sensed cold resistance. Finally, the passage of the processing current is terminated when the established final resistance is achieved by the sheet.

TYPICAL VALUES

By way of illustration and example, and not by way of limitation, it is noted that apparatus of the form shown in FIG. 3 may well have the following component values:

Sample and Hold 76—Type SHM-LM-2 or SHC-298AM
Resistor 87—2.2 Megohms
Resistor 89—0.39 Ohms
FET 91—Type VCR5P
Resistor 117—6.2 KOhms
Capacitor 119—0.01 MFD.
Transformer Winding 125—500 Volts
Transformer Winding 127—14 Volts CT.
Rectifier 129—4/MR 510
Transistor 135—Type BU 208
Rectifiers 141 & 143—Type 1N4148
Resistor 145—15 KOhms
Resistor 147—10 KOhms
Comparator 151—Type 311N
Resistor 157—100 KOhms
Resistor 159—4.7 KOhms
Resistor 161—330 Ohms
Capacitor 163—0.1 MFD.
Resistor 167—4.7 KOhms
Resistor 171—4.7 Megohms
Transistor 185—Type 2N3904
Transistor 187—Type 2N3906
Transistors 189+191—Type MJE700
Resistor 193—1 KOhms
Resistor 195—1.5 KOhms
Resistor 197—1 KOhms
Resistor 199—560 Ohms
Resistor 201—4.7 KOhms
Resistor 203—10 KOhms
Resistor 205—150 Ohms
Resistor 207—0.56 Ohms
Resistor 209—910 Ohms
Resistor 211—100 Ohms
Comparators 221 & 223—Type 311N
Resistor 225—100 KOhms
Resistor 227—330 Ohms
Resistors 229 & 231—4.7 KOhms
Resistor 233—4.7 Megohms
Resistors 235, 237, & 239—4.7 KOhms
Resistor 241—4.7 Meghoms
Resistor 243—4.7 KOhms
Capacitor 245—0.1 MFD
Amplifier 263—Type 201A
Amplifier 265—Type 741
Resistor 283—1 KOhms
Resistor 285—4.7 KOhms
Resistor 289—560 Ohms
Resistor 291—4.7 KOhms
Resistor 295—300 KOhms
Resistor 297—100 KOhms
Capacitor 299—2200 Pf.
Resistor 303—150 KOhms
Diode 309—Type 1N4148
Resistor 311—150 KOhms
Resistor 313—2 KOhms
Capacitor 319—1.0 MFD.
D Flops 335 & 337—Type 74LS74
Resistors 343 & 345—2.2 KOhms
All NAND gates—Type 74LS00

As can be seen from the foregoing list, the resistances of the bridge resistors 87 and 89 for the specific form of apparatus to which the list pertains are not equal. Consequently, those resistances do not have the equality which was earlier assumed herein in order to simplify the given description of the apparatus operation. This means simply that each comparison resistance value which will be established when the above-listed values for the resistors 87 and 89 are employed will still be representative of reciprocal of the corresponding final sheet resistance and its equal, the cold sheet resistance multiplied by the preselected percentage, but will not be equal to that resistance.

It is believed to be clear from the foregoing description that the described method and apparatus fulfill the objects stated herein. Thus, it has been shown that the operation of the disclosed apparatus following the disclosed method causes the temperature of an exposed record sheet to be raised to the desired processing temperature, and hence causes the sheet to be properly processed, without requiring any actual measurement of the sheet temperature, and notwithstanding the variable nature of the cold resistance of the sheet and of the factors which influence the sheet temperature.

The embodiments of the invention in which an exclusive property or privilege is claimed are defined as follows:

1. The method of heating material to the extent which produces a preselected change in the electrical resistance of the material representing a change in the material temperature to a corresponding preselected temperature, comprising the steps of
determining the initial electrical resistance of the unheated material,
setting an electrical resistance means to a set resistance which represents a preselected percentage of said initial resistance, said percentage corresponding to a preselected temperature of said material, applying heat to said material, continuing to determine the prevailing electrical resistance of said material as that resistance changes as said material is heated, comparing said prevailing resistance to said set resistance of said means, and terminating said application of heat to said material when said compared resistances indicate the arrival of said prevailing resistance at said percentage of said initial resistance which is represented by said set resistance, whereby said application of heat is terminated upon the completion of a change in said material temperature to said preselected temperature.

2. The method of heating material to the extent which gives a preselected change in the electrical resistance of the material representing a change in the material temperature to a corresponding preselected temperature, comprising the steps of passing a current from a source through said material and through an impedance to produce a first voltage drop across said impedance while is representative of the resistance of said material, simultaneously passing a current from said source through adjustable impedance means to produce a second voltage drop across said impedance means which is representative of the impedance thereof, adjusting said impedance means to make said second voltage drop have an established value which is equal to a preselected percentage of the value of said first voltage drop at the time at which said passage of said currents commences said percentage corresponding to a preselected temperaure of said material, comparing said first and second voltage drops, and terminating the passage of said current through said material when that current has changed the temperature and resistance of said material to the extent that said first voltage drop has attained a preselected relationship to said established second voltage drop.

3. The method of processing conductive-backed photosensitive material, comprising the steps of establishing electrical contact with the conductive back of said material at spaced locations thereon, passing a current from a source through said material between said established contact, locations to produce a first voltage drop which is representative of the resistance of said material, simultaneously passing a current from said source through an adjustable impedance device to produce a second voltage drop which is representaive of the adjusted impedance of said device, adjusting the impedance of said device to make said second voltage drop have an established value which is equal to a preselected percentage of the value of said first voltage drop at the time at which said passage of said currents commences, said percentage corresponding to a preselected processing temperature of said material, comparing said first and second voltage drops, and terminating the passage of said current through said material when said first voltage drop has attained a preselected relationship to said established second voltage drop indicating the arrival of the temperature of said material at said preselected temperature.

4. Apparatus for raising the temperature of material to a preselected temperature, comprising first means electrically connected to said material for providing a signal which is representaive of the prevailing resistance of said material, heat controlling means for controlling the application of heating energy to said material, and second means connected to receive said signal and connected to said controlling means for causing the latter to effect the application of heating energy to said material at a starting time, and for subsequently terminating said application of heating energy to said material when said signal has changed to a preselected percentage of the value at said starting time, which percentage corresponds to said preslected temperature of said material, whereby the temperature of said material is raised to said preselected temperature.

5. Apparatus for raising the temperature of material from an initial value to a preselected higher value, comprising circuit means coupled to said material for passing a material heating current through said material when said circuit means is energized, and for producing from said current a first signal which represents the prevailing resistance of said material, means for producing a second signal which represents a preselected percentage of the initial resistance of said material when at said initial temperature, said percentage corresponding to said preselected higher temperature, and detecting means connected to receive and compare said first and second signals and to cause said circuit means to be energized when said comparison indicates that said prevailing resistance is less than said percentage of said initial resistance, and to cause the energization of said circuit means to be terminated when said comparison indicates that said prevailing resistance corresponds to said percentage of said initial resistance, whereby said passage of said heating current is terminated when said material temperature attains said preselected value.

6. Apparatus for raising the temperature of material from an initial value to a preselected higher value, comprising circuit means coupled to said material for passing a material heating current through said material when said circuit means is energized, and for producing from said current a first signal which represents the prevailing resistance of said material, sample and hold means connected to said circuit means to cause the latter, when energized, to produce a second signal which represents a preselected percentage of the initial resistance had by said material when at said initial temperature, which percentage corresponds to said preselected higher temperature, said first signal becoming substantially equal to said second signal when said prevailing resistance corresponds to said percentage of said initial resistance as said heating current raises the temperature of said material, and detecting means connected to receive and compare said first and second signals when said circuit means is energized, and to terminate that energization when said compared signals become substantially equal, whereby said passage of said heating current is terminated when said material temperature attains said preselected value.

7. Apparatus for raising the temperature of material from an initial value to a preselected higher value, comprising circuit means coupled to said material for passing a material heating current through said material when said circuit means is energized, and for producing from said current a first signal which represents the prevailing resistance of said material, sample and hold means connected to said circuit means for establishing a resistance value therein which represents a preselected percentage of the initial resistance had by said material when at said initial temperature, said percentage corresponding to said preselected higher temperature, said energization of said circuit means causing the latter to produce a second signal which represents said established resistance value, and detecting means connected to receive and compare said first and second signals and to cause said circuit means to be energized when said comparison indicates that said prevailing resistance is less than said percentage of said initial resistance, and for terminating the energization of said circuit means when said comparison indicates that said prevailing resistance corresponds to said percentage of said initial resistance, Whereby said passage of said heating current is terminated when said material temperature attains said preselected value.

8. Apparatus for processing conductive-backed photosensitive material, comprising contact means for establishing electrical contact with The conductive back of said material as spaced locations thereon, first means connected to said contact means for providing a signal which is representative of the prevailing resistance of said material, heat controlling means for controlling the application of heating energy to said material, and second means connected to receive said signal and connected to said controlling means for causing the latter to effect the application of heating energy to said material at a starting time at which said prevailing resistance is the cold resistance of said material, and for subsequently terminating said application of heating energy to said material when said signal indicates that said prevailing resistance has become a preselected percentage of said cold resistance, said percentage corresponding to a preselected processing temperature of said material, whereby the temperature of said material is raised to said preselected temperature.

9. Apparatus for processing conductive-backed photosensitive material, comprising contact means for establishing electrical contact with the conductive back of said material at spaced locations thereon, first means connected to said contact means for providing a signal which is representative of the prevailing resistance of said material, heat controlling means for controlling the application of heating energy to said material, and second means connected to receive said signal and connected to said controlling means for causing the latter to effect the application of heating energy to said material at a starting time at which said prevailing resistance is the cold resistance of said material, for establishing a second signal at said starting time which represents a preselected percentage of said cold resistance, and for comparing said first and second signals and terminating said application of heating energy to said material when said comparison indicates that said prevailing resistance corresponds to said percentage of said cold resistance, said percentage correspoding to a preselected processing temperature of said material, whereby the temperature of said material is raised to said preselected temperature.

10. Apparatus for processing conductive-backed photosensitive material, comprising contact means for establishing electrical contact with the conductive back of said material at spaced locations thereon, supply means for passing a current from a source through said material by way of said contact means to heat said material and to produce a first signal which is representative of the prevailing resistance of said material, and for simultaneously passing a current from said source through an adjustable impedance device to produce a second signal which is representative of the adjusted impedance of said device, normalizing means connected to receive said first and second signals and responsive thereto to adjust the impedance of said device to an adjusted value which makes said second signal have an established value, said established value representing a preselected percentage of the initial resistance had by said material at a starting time at which the passage of said currents commences, and said percentage corresponding to a preselected processing temperature of said material, and detecting means connected to receive and compare said first signal and said established second signal and to cause said supply means to terminate said passage of said current through said material when said first signal has attained a preselected relationship to said established second indicating the arrival of said prevailing resistance substantially at said percentage of said initial resistance, and hence the arrival of said material temperature at said preselected processing temperature.

11. Apparatus as specified in claim 10, wherein said normalizing means makes said established value of said second signal equal to a percentage of the value had by said first signal at said starting time, the last noted percentage being the reciprocal of said preselected percentage.

12. Apparatus as specified in claim 11, wherein said adjusted value of said impedance means is a comparison value which corresponds to the value of said prevailing resistance which is attained when said material attains said preselected processing temperature.

13. Apparatus for processing conductive-backed photosensitive material, comprising contact means for establishing electrical contact with the conductive back of said material at spaced locations thereon, a first circuit connecting said contact means between first and second energizing terminals and having a first output terminal, the application of energizing voltage between said energizing terminals causing heating current to flow through said material and producing between said first output and first energizing terminals a first signal representing the prevailing resistance of said material, a second circuit connecting an adjustable impedance device between said energizing terminals and having a second output terminal, said energizing voltage application producing between said second output and first energizing terminals a second signal representing the adjusted impedance of said device sample and hold means connected to said output terminals and to said device and responsive to said signals, upon said energizing voltage application, to adjust the impedance of wall device to the comparison value at which said second signal is established as a preselected percentage of the initial value of said first signal corresponding to an initial value of said prevailing resistance, said percentage corresponding to a preselected processing temperature of said material, and said first signal becoming substantially equal to said established second signal when said prevailing resistance has changed to a final value which is substatially equal to its said initial value times the reciprocal of said percentage, and detecting means connected to control said energizing voltage application, connected to said output terminals, and responsive to said signals to permit said energizing voltage application when said signals are not equal, and to effect the termination of said energizing voltage application when said signals become substantially equal as said prevailing resistance substantially attains said final value and said material temperature becomes substantially equal to said preselected processing temperature.

14. Apparatus as specified in claim 13, wherein said apparatus includes supply means connected to said energizing terminals and operative, when activated, to effect said energizing voltage application by applying pulsing d.c. energizing voltage between said energizing terminals, whereby said first and second signals are pulsing d.c. voltages, said detecting means includes means to compare said signals to reference d.c. signals to produce a material pulse signal with a pulse width corresponding to said prevailing resistance, and to produce a comparison pulse signal with a pulse width corresponding to said comparison value of said device impedance, and said detecting means also include pulse width responsive means connected to control said supply means and connected to compare said two pulse signals and to activate said supply means, to effect said energizing voltage application, until the relative pulse widths of said pulse signals indicate that said first and second signals have become substantially equal and hence that said prevailing resistance has attained said final value.

15. Apparatus as specified in claim 14, wherein said detecting means includes means to terminate said activation of said supply means, to terminate said energizing voltage application, when said material pulse signal indicates the absence of said electrical contact with the conductive back of said material.

* * * * *